J. C. STURM.
TRACTOR.
APPLICATION FILED MAY 25, 1916.
1,227,016.
Patented May 22, 1917.
2 SHEETS—SHEET 1.
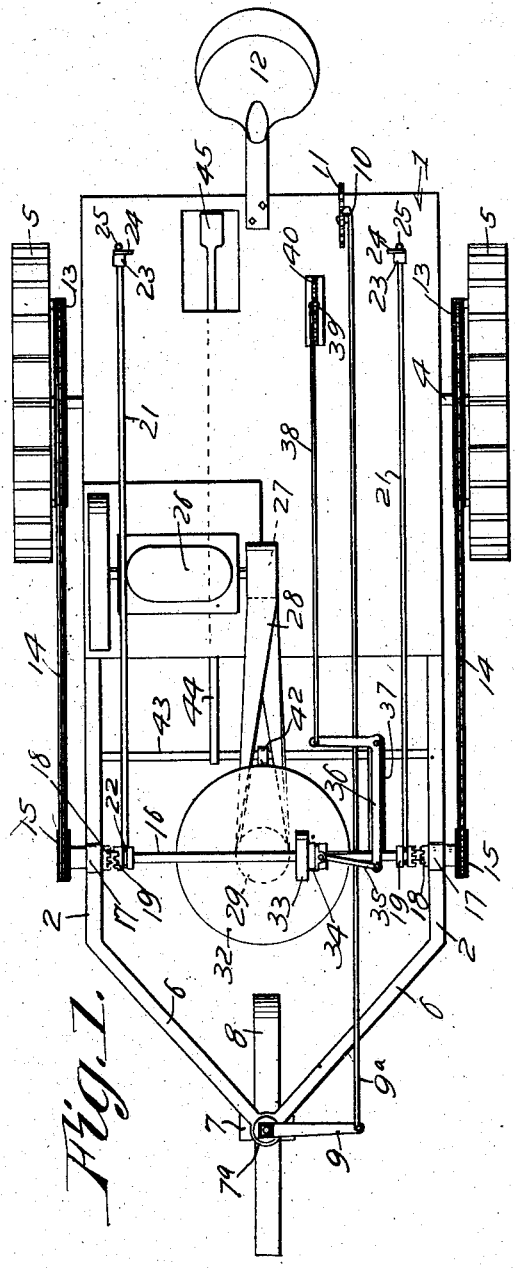
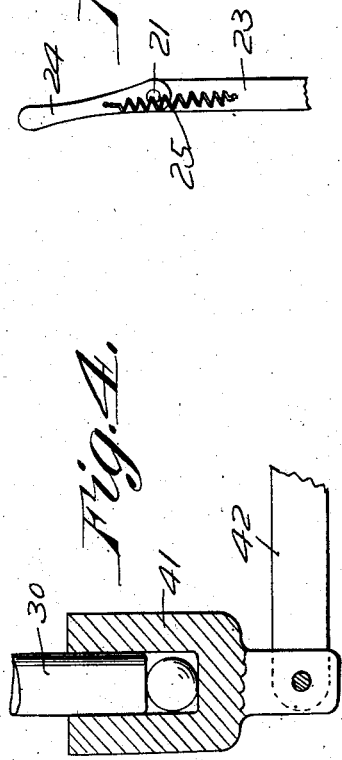
Witnesses
James C. Sturm,
Inventor
by C. A. Snow & Co.
Attorneys J. C. STURM.
TRACTOR.
APPLICATION FILED MAY 25, 1916.
1,227,016.
Patented May 22, 1917.
2 SHEETS—SHEET 2.
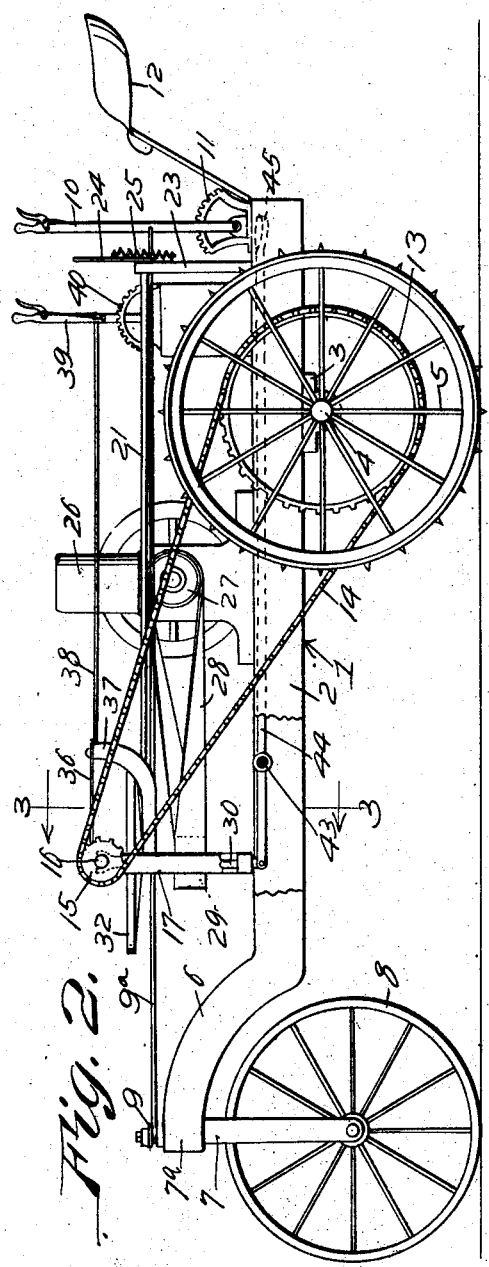
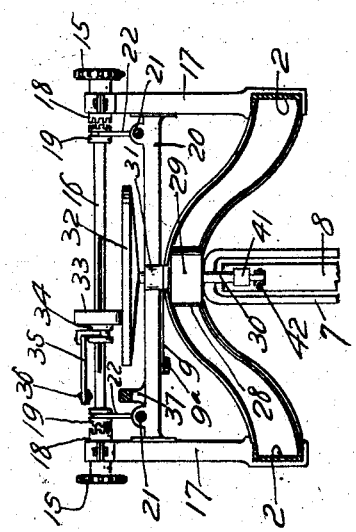
Witnesses
James C. Sturm,
Inventor
by C. A. Snow & Co.
Attorneys

UNITED STATES PATENT OFFICE.

JAMES CLINTON STURM, OF GRAFTON, WEST VIRGINIA.

TRACTOR.

1,227,016. Specification of Letters Patent. Patented May 22, 1917.

Application filed May 25, 1916. Serial No. 99,868.

*To all whom it may concern:*

Be it known that I, JAMES C. STURM, a citizen of the United States, residing at Grafton, in the county of Taylor and State of West Virginia, have invented a new and useful Tractor, of which the following is a specification.

The present invention appertains to tractors, and aims to provide a novel and improved tractor adapted to carry and operate a mowing machine, to pull a plow, harrow, or the like, and to be used generally for agricultural and other purposes.

It is the object of the invention to provide a tractor having a novel transmission mechanism between the engine or other prime mover and the traction wheels, whereby the tractor can be readily started and stopped, the speed thereof changed, and the machine readily steered to one side or the other by a short turn.

It is also the object of the invention to provide a tractor having the features above noted, which is comparatively simple and inexpensive in construction, and which is generally useful for agricultural and similar purposes.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:

Figure 1 is a plan view of the improved tractor.

Fig. 2 is a side elevation thereof, portions being broken away.

Fig. 3 is a cross section taken on the line 3—3 of Fig. 2.

Fig. 4 is an enlarged sectional detail of the thrust bearing.

Fig. 5 is a detail view of one of the clutch operating handles.

The tractor embodies a suitable frame 1 comprising the longitudinal side beams 2 constructed of channel iron or other suitable stock, and having bearings 3 secured thereto adjacent their rear ends. A rear axle or shaft 4 is journaled in the bearings 3 and has the traction wheels 5 secured to the ends thereof. The forward ends of the beams 2 converge toward one another and are curved upwardly over the front steering or guide wheel 8. Said steering wheel 8 is mounted for rotation in a fork 7 which is in turn mounted for rotation about a vertical axis in the bearing 7ª with which the adjacent forward ends of the beams 2 are equipped. The angling of the wheel 8 is accomplished by means of an arm 9 secured to the upper end of the fork 7 and projecting toward one side, and a link or rod 9ª connecting said arm 9 and a hand lever 10 fulcrumed to the frame adjacent the rear end thereof, the frame having a segment 11 whereby the lever 10 can be held in various positions to hold the wheel 8 at any position to which it is angled. The operator's seat 12 is carried by the rear end of the frame.

The transmission mechanism for connecting the traction wheels 5 with the engine or prime mover embodies relatively large sprocket wheels 13 secured to the traction wheels 5 and connected by endless sprocket chains 14 with relatively small sprocket wheels 15 mounted loosely upon the ends of a transverse jack shaft 16. This jack shaft 16 is carried by pedestals or standards 17 secured to the beams 2 in front of the traction wheels. The sprocket wheels 15 have clutch hubs 18, and clutch members 19 are slidable or feathered upon the shaft 16 to move into and out of engagement with the clutch hubs 18, whereby the two traction wheels can be connected with and disconnected from the jack shaft.

A yoke 20 connects the pedestals 17 and has bearings in which longitudinal rock shafts 21 are journaled adjacent their forward ends. Said rock shafts 21 have upstanding arms 22 adjacent their forward ends loosely engaged with the clutch members 19, whereby when the arms 22 are oscillated transversely, the clutch members are moved into and out of engagement with the clutch hubs 18. The clutch members 19 rotate with the shaft 16 and can rotate relative to the arms 22. The shafts 21 are journaled adjacent their rear ends in pedestals or standards 23 carried by the frame adjacent its rear end, and upwardly projecting handles 24 are secured to the rock shafts 21 adjacent their rear ends near the operator's seat 12. Springs 25 connect the handles 24 and pedestals 23 to hold said handles in either position, with the clutches either in or out of engagement.

The engine or other prime mover 26 is carried by the frame 1 preferably in rear of the jack shaft 16, and its crank shaft has a pulley wheel 27 secured thereto which is connected by an endless belt 28 with a pulley wheel 29 secured upon a vertical shaft 30. This shaft 30 is journaled within and slidable vertically in a bearing 31 with which the yoke 20 is provided between its ends, and a horizontal friction disk 32 is secured upon the upper end of the shaft 30 for the engagement of a friction wheel 33 feathered upon the jack shaft 16. The hub 34 of the friction wheel 33 has a link 35 engaged therewith in any suitable manner so that the wheel 33 can turn without the link 35 turning therewith, and said link 35 is connected to one arm of a bell crank lever 36 having its elbow fulcrumed upon a bracket 37 carried by the yoke 20. The other arm of the bell crank lever 36 is connected by a link or rod 38 with a hand lever 39 carried by the frame adjacent the seat 12, a segment 40 being provided for holding the lever 39 at various positions. The lower end of the shaft 30 seats within a vertical thrust bearing 41 pivotally or otherwise connected with a forwardly projecting arm 42 attached to a transverse rock shaft 43 journaled to the beams 2. A rearwardly projecting relatively long arm 44 it attached to said rock shaft 43 and is provided at its rear end with a foot piece 45 near the seat 12 which can be readily depressed by the foot of the operator. Said arms 42 and 44 with the rock shaft 43 provide a foot lever, which when the foot piece 45 is depressed, will raise the thrust bearing 41 and shaft 30, thereby bringing the friction disk 32 into contact with the friction wheel 33.

In operation, the tractor is easily started or stopped, by operating the foot lever or pedal. When the foot piece 45 is depressed, the shaft 30 is raised to bring the friction disk 32 into engagement with the friction wheel 33, thereby connecting the traction wheels with the engine, and when the foot piece 45 is released, the shaft 30 and its disk 32 can gravitate to remove the disk 32 from the wheel 33, thereby breaking the connection between the traction wheels and engine. The engine 26, in addition to propelling the tractor, is used for operating a mowing machine carried by the frame 1. and can be used for operating various other machines or devices. When the friction disk 32 is raised into engagement with the friction wheel 33, and the clutch members 19 are moved into engagement with the clutch hubs 18, the jack shaft 16 in being rotated will actuate the chains 14 to rotate the propelling wheels 5, whereby to propel the tractor. The speed of the tractor is controlled by shifting the friction wheels 33 transversely of the machine or radially relative to the disk 32, through the medium of the hand lever 39, and by moving said friction wheel 33 to the opposite side of the disk 32 past the center thereof, the direction in which the tractor is propelled will be changed, so that the tractor can be propelled either forwardly or rearwardly. The tractor is guided by means of the wheel 8, and when it is desired to make a short turn at the end of the field or at the corner thereof, the traction wheel 5 at that side toward which the turn is to be made, is disconnected from the jack shaft 16, by moving the respective clutch member 19 away from the corresponding clutch hub 18. Thus, the traction wheel 5 at the opposite side will exert a turning movement to the frame of the tractor, which in connection with the proper positioning of the wheel 8, will cause the tractor to make a short turn.

Having thus described the invention, what is claimed as new is:

A tractor embodying a frame, a pair of traction wheels supporting it, a transverse jack shaft carried by the frame and having its ends connected with the traction wheels, a friction wheel slidable upon the jack shaft, means for shifting said friction wheel, a vertical shaft mounted for rotary and sliding movements below the jack shaft, a horizontal friction disk carried by the upper end of the vertical shaft to engage said friction wheel, a prime mover carried by the frame and operatively connected with the vertical shaft, and a lever carried by the frame and having a thrust bearing supporting said vertical shaft, said lever being operable for raising the vertical shaft.

In testimony that I claim the foregoing as my own, I have hereto affixed my signature in the presence of two witnesses.

JAMES CLINTON STURM.

Witnesses:
 R. A. MORROW,
 B. S. DILWORTH.